United States Patent [15] 3,668,234
Griot [45] June 6, 1972

[54] BIS-HALOPHENOXYACETIC ACID ESTERS OF POLYALKANOLS

[72] Inventor: Rudolf G. Griot, Florham Park, N.J.

[73] Assignee: Sandoz-Wander, Inc., Hanover, N.J.

[22] Filed: July 13, 1970

[21] Appl. No.: 61,033

Related U.S. Application Data

[60] Division of Ser. No. 769,725, Oct. 22, 1968, Pat. No. 3,542,795, which is a continuation-in-part of Ser. No. 748,234, July 29, 1968, abandoned.

[52] U.S. Cl. .................................260/473 G, 424/308
[51] Int. Cl. ...........................................C07c 69/76
[58] Field of Search .....................260/520, 473 G

[56] References Cited

OTHER PUBLICATIONS

Brunet et al., Chem. Abst., 61, 1793g (1964)

*Primary Examiner*—James A. Patten
*Assistant Examiner*—John F. Terapane
*Attorney*—Gerald D. Sharkin, Frederick H. Weinfeldt, Robert S. Honor, Walter F. Jewell and Richard E. Vila

[57] ABSTRACT

The compounds are esters of derivatives of acetic acid and contain a plurality of bis-(p-halophenoxy)acetoxy functions, e.g., the bis-p-chlorophenoxyacetic acid ester of ethylene glycol, and are useful as hypocholestermic agents.

4 Claims, No Drawings

BIS-HALOPHENOXYACETIC ACID ESTERS OF POLYALKANOLS

This application is a division of Ser. No. 769,725, filed Oct. 22, 1968, now Pat. No. 3,542,795 said Ser. No. 769,725 being a continuation-in-part of copending application Ser. No. 748,234 filed July 29, 1968, now abandoned.

This invention relates to pharmaceutically useful chemical compounds, and more particularly to compounds containing a plurality of bis-(p-halophenoxy)acetoxy functions and to the preparation and use of such compounds.

The compounds of the invention are conveniently represented by the structural formula I:

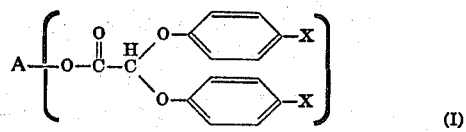

wherein
$n$ is a whole integer of from 2 to 6;
X is a halogen atom having an atomic weight of from 35 to 80, i.e. a chlorine or bromine atom; and
A is either a saturated lower aliphatic hydrocarbon moiety having 2 to 6 units of valency, e.g., having from two to six carbon atoms, such as —CH$_2$—CH$_2$— or C—(CH$_2$)$_4$, the number of units of valency of A being equal to $n$ and no carbon atom having more than one unit of valency; or a divalent function of the structure:

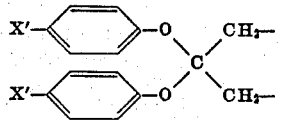

wherein X' is a halogen having an atomic weight of from 35 to 80, i.e. a chlorine or bromine atom,
then $n=2$; or
a dimethyl pyridine residue having the formula

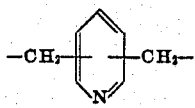

Compounds I are obtainable by esterifying (step A) a compound II

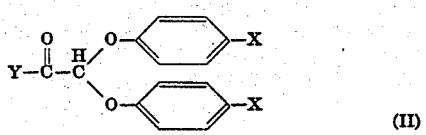

wherein
X is as defined above; and
Y is a halogen atom having an atomic weight of from 35 to 80, i.e. a chlorine or bromine atom, with a compound III

wherein A and $n$ are as defined above. Advantageously at least $n$ moles of compound II per mole of compound III should be provided to the reaction. Preferably a 5 percent to 50 percent molar excess of compound II is used in the reaction, over that required to satisfy the molar ratio $n \times II=III$.

The esterification (Step A) may be carried out in a suitable inert organic solvent, e.g., benzene, toluene, chloroform and diethyl ether, and at a temperature of 20° C or below. Step A, if desired, may be carried out at elevated temperatures; however, in such instances, external cooling should be provided since the reaction is exothermic. Preferably the reaction is carried out at a temperature of from about −10° to about 5° C. It is advantageous to provide a means for removing the hydrogen halide liberated by the reaction, e.g., by carrying out the reaction in the presence of an acid binding agent, such as an alkali metal carbonate, e.g., potassium carbonate, or suitable organic base, e.g., pyridine or triethylamine.

Alternatively, a compound I may be obtained by transesterifying (Step B) a compound III with a compound IV

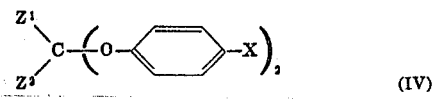

wherein
X is as defined above,
Z$^1$ is (lower)alkoxycarbonyl having the formula

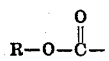

wherein
R is lower alkyl, preferably unbranched alkyl having from one to four carbon atoms; and
Z$^2$ is either Z$^1$ or a hydrogen atom.

A compound IV wherein Z$^2$ is a hydrogen atom is a compound IV$a$, i.e. an acetic acid ester derivative. A compound IV wherein Z$^2$ is (lower) alkoxycarbonyl is a compound IV$b$, i.e. a malonic acid diester derivative.

Step B is carried out employing a compound IV$a$, in a conventional manner for transesterifying an ester and an alcohol, e.g., in an inert organic solvent and in the presence of an alkali metal alkoxide, preferably sodium methoxide or ethoxide. Preferably, a temperature of at least 50° C. is utilized, e.g., at reflux temperature of the solvent. However, when employing a compound IV$b$, Step B is carried out in the same manner as for a compound IV$a$, except that the temperature should be sufficiently high for partial decarboxylation to occur, a temperature of at least 70° C. being desirable for this purpose, and the solvent should have a boiling point of not less than 75° C., e.g., benzene, toluene or xylene.

Compounds II, dimethyl pyridines, as well as compounds III$a$, i.e. compounds III wherein A is a saturated lower aliphatic hydrocarbon moiety, are known and may be prepared by methods known per se; or where not known, they may be prepared by methods analogous to the methods for preparing known compounds. Compounds suitable as compounds II include bis-(p-chlorophenoxy)acetyl chloride.

Compounds III$a$ may be unbranched, e.g., ethylene glycol, glycerol or mannitol, or branched, e.g., pentaerythritol, or alicyclic, e.g., inositol. Preferred compounds III$a$ include diols, triols and tetrols. Preferred compounds III$a$ are those having from 1 to 1.5 carbon atoms per unit of valency.

Compounds IV are readily prepared by condensing a compound V, i.e. an appropriate alkali phenolate, with a compound VI, i.e. a di- (lower)alkyl dihalomalonate or (lower)alkyl dihaloacetate, by known means (Step C).

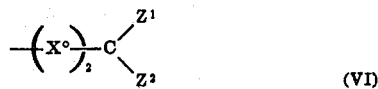

wherein Z$^1$ and Z$^2$ are as defined above and X° is halo having an atomic weight of 35 to 80, i.e. bromo or chloro.

Step C (the condensation) is readily carried out in a suitable inert organic solvent, e.g., dimethylacetamide, diethylacetamide and dimethylformamide, and at from 20° to 80° C., preferably from 20° to 30° C., using a molar ratio of compound V to compound VI of at least 2:1. Preferably compound V is a sodium or potassium phenolate. The Z$^1$ and Z$_2$ substituents of the resultant compound IV correspond to the Z$^1$ and Z$^2$ substituents of the compound VI starting material.

A compound III, which is an appropriate 2,2-bis(p-halophenoxy)-1,3-propanediol, is obtainable by reduction of an appropriate compound IV$b$, e.g., bis-(p-chlorophenoxy)malonic acid dialkyl ester is reduced to form 2,2-bis-(p-chlorophenoxy)-1,3-propanediol. The reduction is conveniently effected as an inert organic solvent, preferably a lower alkanol, such as methanol or ethanol, employing an appropriate hydride reducing agent. The reduction is preferably effected employing sodium borohydride although lithium aluminum hydride can also be used. The reduction of the bis-(p-halophenoxy)malonic acid dialkyl ester (IV) with sodium borohydride results in the formation of the intermediate boron complex of the formula

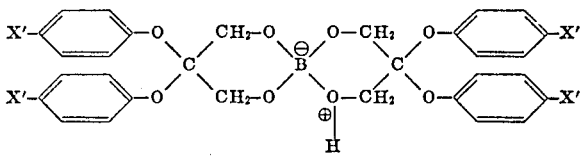

wherein X' is as defined above.

Such complex can be readily isolated in conventional manner or converted in situ to the desired diol (a compound III) by treatment with aqueous ammonia solution or aqueous sodium fluoride solution. The reduction is preferably carried out at reflux temperature although elevated temperatures up to reflux temperature can be employed. The resulting diol can be readily isolated employing conventional techniques.

Various of the alcohols, alcoholates, phenols and phenolates employed as reactants above are known and are prepared according to methods disclosed in the literature. Those others not specifically desired in the literature are prepared by analogous methods from known materials.

The compounds of formula I are useful because they possess pharmacological properties in animals. In particular these compounds are useful as hypocholesteremics/hypolipemics, as indicated by their activity in a group of white rats which are given 30 milligrams per kilogram of body weight per diem of the compound orally, for 6 days, and then anesthetized with sodium hexabarital, bled and then tested by extracting serum or plasma with isopropanol and noting the cholesterol and triglyceride contents of the extracts as compared to those of a control group. The cholesterol and triglyceride contents are determined by the methods described by Lofland, H.B., Anal Biochem, 9:393 (1964): (Technicon method N 24a); and Kessler, G., and Lederer, H. Technicon Symposium, Mediad Inc., New York, pages 345–347, (1965), respectively. For such usage, the compounds may be administered orally as such or admixed with conventional pharmaceutical carriers or administered orally in such forms as tablets, dispersible powders, granules, capsules, syrups and elixirs. Such compositions may be prepared according to any methods known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin.

For the treatment of hypercholesteremia/hyperlipemia, noted above, the dosage administered may vary depending on the particular compound employed and the severity of the condition being treated. In general, satisfactory results are obtained when administered at a daily dosage of from about 4 milligrams to about 30 milligrams per kilogram of animal body weight, preferably given in divided doses, 2 to 4 times a day, or in sustained release form. For most mammals the total daily dosage is from about 0.25 grams to about 2 grams of the compound, and the dosage forms suitable for internal use comprise from about 50 milligrams to about 1,000 milligrams of active compound in intimate admixture with a solid or liquid pharmaceutically acceptable carrier or diluent. The preferred pharmaceutical compositions from the standpoint of preparation and ease of administration are solid compositions, particularly hard-filled capsules and tablets containing from 75 milligrams to about 500 milligrams of the active ingredient.

A representative formulation suitable for oral administration is a tablet prepared by standard tabletting techniques and containing the following:

| Ingredient | Parts by Weight |
| --- | --- |
| 1,2-ethylene di-bis(p-chlorophenoxy)acetate | 75 |
| Tragacanth | 2 |
| Lactose | 14.5 |
| Corn Starch | 5 |
| Talcum | 3 |
| Magnesium Stearate | 0.5 |

The following examples serve to further illustrate the present invention. However, it is to be understood that the examples are for purposes of illustration only and are not intended as in any way limiting the scope of the invention which is defined in the appended claims. The temperatures are centigrade, unless indicated otherwise and room temperature is from 20° to 25° C.

EXAMPLE 1

Bis(p-chlorophenoxy)acetic acid diester with the Bis(p-chlorophenoxy)acetal of dihydroxy acetone.

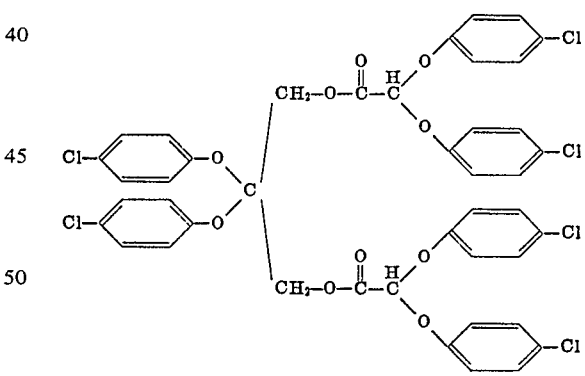

Step A. Preparation of bis-(p-chlorophenoxy)malonic acid diethyl ester.

Sodium hydride in mineral oil (56.7 percent), 43.3 g. (1.0 mole), is washed with dry, low boiling petroleum ether and the washed sodium hydride suspended in 1,500 ml. of dimethylacetamide. The resulting suspension is cooled to 0° and 141.4 g. (1.10 moles) of p-chlorophenol is added with stirring to the cooled suspension at such a rate that the temperature thereof does not exceed 10° (external cooling with an ice/salt bath being employed as necessary). After all of the p-chlorophenol is added, the mixture is stirred for an additional hour and then 159 g. (0.5 mole) of diethyldibromomalonate is added to the mixture fairly rapidly allowing the temperature of the mixture to rise to about 32°. Stirring is continued for 88 hours and then three-fourths of the solvent is evaporated in vacuo. To the resulting concentrate is added 1,500 ml. of ethyl acetate, and the mixture thus obtained is then washed twice with 1,500 ml. (each) of water and twice with 750 ml. (each) of 2 N aqueous sodium hydroxide. The washed organic phase is then dried over anhydrous magnesium sulfate, filtered and the filtrate evaporated. The residue is recrystallized from 95 percent ethanol to obtain bis-(p-chlorophenoxy)malonic acid diethyl ester, m.p. 48°–50°.

Step B. Preparation of 2,2-bis(p-chlorophenoxy)-1,3-propanediol.

To a solution of 206.5 g. (0.5 mole) of bis-(p-chlorophenoxy) malonic acid diethyl ester in 2,500 ml. of absolute ethanol is added, over a period of one-half hour, 66.2 g. (1.75 mole) of sodium borohydride while maintaining the temperature of the reaction at about 35°–45°. The mixture is then refluxed for 4 hours, the ethanol evaporated off and the residue (Boron complex) taken up in 2,000 ml. of dimethylacetamide. To the resultant is added (portionwise) 200 ml. of concentrated ammonium hydroxide, and the resulting mixture allowed to stand for one-half hour at room temperature (20°) and then evaporated under a water aspirator vacuum at 70°–80°. To the residue is added 3,000 ml. of ethyl acetate, and the resulting mixture extracted twice with 2,000 ml. (each) of water. The ethyl acetate layer is then dried over sodium sulfate, filtered and the ethyl acetate evaporated off. The resulting oil is added to 3,000 ml. of carbon tetrachloride, and the mixture cooled to room temperature to yield a white voluminous fluffy crystalline product. After crystallization is complete, the mixture is cooled to 0° using an ice/salt bath. The crystalline product thus obtained is filtered off, washed first with cold (0°) carbon tetrachloride and then with low boiling (30°–60°) petroleum ether and then dried in a high vacuum oven at 50°, to obtain 2,2-bis-(p-chlorophenoxy)-1,3-propanediol, m.p. 87°–89°.

Step C. Preparation of bis(p-chlorophenoxy)acetic acid diester with the bis(p-chlorophenoxy)acetal of dihydroxy acetone.

To 16.5 g of 2.2 - di-(p-chlorophenoxy)-propane - 1,3-diol in 100 ml of benzene and 12 ml triethylamine at 0° a solution of 35 g bis-(p-chlorophenoxy)-acetyl chloride in 100 ml of benzene are added slowly, keeping the reaction temperature at 0°–5°.

After stirring for 2 hours, the reaction mixture is successively washed with 500 ml water, 200 ml of 1N hydrochloric acid, 800 ml of cold 0.5N sodium hydroxide solution (0°), and 500 ml water.

The organic phase is separated, dried over magnesium sulfate and evaporated in vacuo to obtain crude title compound as a residue.

The crude title compound is then crystallized from 300 ml. isopropanol, mp 112°–116°.

EXAMPLE 2

1,2 - ethylene-di-bis(p-chlorophenoxy)acetate.

Cl—⟨⟩—O\\H  O                    O  H/O—⟨⟩—Cl
          C—C—O—CH₂CH₂—O—C—C
Cl—⟨⟩—O/                          \\O—⟨⟩—Cl

To 206 g of bis(p-chlorophenoxy)malonic acid ethyl ester in 62 g of ethylene glycol and 1.0 liter benzene, 4 g. of sodium methoxide are added and the mixture distilled at atmospheric pressure.

After cooling the distillate, 500 ml benzene and 250 ml water are added thereto and thoroughly mixed and the phases separated.

The benzene layer is evaporated in vacuo to obtain a residue which is then dissolved in 250 ml isopropanol. The resulting solution is treated with charcoal at reflux, filtered, and cooled to 0° causing a solid to separate. The solid is collected and recrystallized twice from methanol to yield the title compound, mp 93°–96°.

EXAMPLE 3

Bis(p-chlorophenoxy)acetic acid, ester with pentaerythritol.

$$\left[ \text{Cl}-\bigcirc-\text{O} \diagdown_{\text{C}}^{\text{H}} \overset{\text{O}}{\underset{\|}{\text{C}}}-\text{O}-\text{CH}_2 \right]_4 \text{C}$$

2.72 g (0.02 m) of pentaerythritol, in 50 ml of pyridine is cooled to 0° and then treated with 200 ml (0.1 m) of a toluene solution of bis-(p-chlorophenoxy)-acetyl chloride while maintaining the temperature at 0° – 5° throughout the addition.

The mixture is allowed to stand for 66 hours at room temperature (25° C) then the pyridine evaporated leaving a residue which is then dissolved in 100 ml of chloroform.

The chloroform solution is then washed with 50 ml of 2N hydrochloric acid, water, and two times with 50 ml portions of saturated aqueous sodium bicarbonate solution.

The organic layer is separated, dried for 18 hours over magnesium sulfate, and the solvent is evaporated to obtain the title product as a highly viscous residue.

EXAMPLE 4

Bis-(p-chlorophenoxy)acetic acid diester of 2,6-dimethylol pyridine.

Cl—⟨⟩—O\\H  O              O  H/O—⟨⟩—Cl
         C—C—OCH₂—⟨N⟩—CH₂—OC—C
Cl—⟨⟩—O/                     \\O—⟨⟩—Cl 80 g (0.244 mole) of methyl ester of bis-(p-chlorophenoxy) acetate and 17 g (0.122 mole) of 2,6-dimethylol pyridine are added to 250 ml of toluene. 0.5 g of sodium methoxide is then added and the mixture brought to reflux during a period of one-half hour, and then refluxed for 1 hour. The mixture is then cooled to room temperature, 100 ml of toluene added and the mixture washed with water. The toluene phase is dried over magnesium sulfate and the solvent removed under vacuum to obtain a residue. The residue is then crystallized from ethanol to obtain bis-(p-chlorophenoxy)acetic acid diester of 2,6-dimethylol pyridine, mp 95° – 100°.

What is claimed is:

1. A compound of the formula $$A \left[ -\text{O}-\overset{\text{O}}{\underset{\|}{\text{C}}}-\overset{\text{H}}{\underset{}{\text{C}}} \diagup_{\text{O}-\bigcirc-\text{X}}^{\text{O}-\bigcirc-\text{X}} \right]_n$$

wherein n is a whole integer of from 2 to 6;

X is a halogen atom having an atomic weight of from 35 to 80; and

A is either a saturated lower aliphatic hydrocarbon moiety having from 2 to 6 units of valency; the number of units of valency of A being equal to $n$ and no carbon atom having more than one unit of valency; or a divalent function of the structure:

$$\text{X}'-\bigcirc-\text{O} \diagdown_{\text{C}} \diagup^{\text{CH}_2-}_{\text{CH}_2-}$$
$$\text{X}'-\bigcirc-\text{O} \diagup \qquad \diagdown$$

wherein X' is a halogen having an atomic weight of from 35 to 80, then $n = 2$.

2. The compound of claim 1 wherein $n$ is 2, X is a chlorine atom and A is —$CH_2$—$CH_2$—.
3. The compound of claim 1 wherein $n$ is 4, X is a chlorine atom and A is C-($CH_2$-)-$_4$ .
4. The compound of claim 1 wherein $n$ is 2, X is chlorine and A is
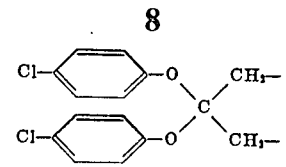
* * * * *